United States Patent [19]

Nitto et al.

[11] Patent Number: 5,866,636
[45] Date of Patent: Feb. 2, 1999

[54] NON-ASBESTOS FRICTION MATERIAL

[75] Inventors: Fumiaki Nitto; Tatsuya Sano; Seigou Sakagami; Masanori Ibuki; Hiroya Kishimoto, all of Hyogo, Japan

[73] Assignee: Sumitomo Electric Industries, Ltd., Japan

[21] Appl. No.: 808,541

[22] Filed: Feb. 28, 1997

Related U.S. Application Data

[63] Continuation-in-part of Ser. No. 523,914, Sep. 6, 1995, abandoned.

[30]     Foreign Application Priority Data

Sep. 12, 1994   [JP]   Japan .................................. 6-216965

[51] Int. Cl.$^6$ ...................................................... C08J 5/16
[52] U.S. Cl. ............................ 523/155; 524/15; 524/430; 524/493; 524/494; 524/495; 523/149
[58] Field of Search ..................................... 523/155, 149; 524/15, 430, 493, 494, 495

[56]            References Cited

U.S. PATENT DOCUMENTS 4,895,882   1/1990   Asano et al. ............................ 523/145

FOREIGN PATENT DOCUMENTS 05232956   of 1993   Japan .

*Primary Examiner*—Marion McCamish
*Assistant Examiner*—John J. Guarriello
*Attorney, Agent, or Firm*—Wenderoth, Lind & Ponack, L.L.P.

[57]            ABSTRACT

A non-asbestos friction material containing a reinforcing fiber other than asbestos, organic fillers, friction adjusting ingredients, and a thermosetting resin for binding the reinforcing fiber, the organic fillers and the friction adjusting ingredients together. The friction adjusting ingredients contain magnesia in the form of aggregated particles which are an aggregate of minute particles. The use of magnesia in the form of aggregated particles reduces low-frequency noise and squeak while keeping the attack on the mating member low and keeping high the resistance to fading and the coefficient of friction.

3 Claims, No Drawings

NON-ASBESTOS FRICTION MATERIAL

CROSS REFERENCE TO RELATED APPLICATION

This is a continuation-in-part of application Ser. No. 08/523,914, filed Sep. 6, 1995, now abandoned.

BACKGROUND OF THE INVENTION

The present invention relates to a friction material for use as automotive disk brake pads and brake linings, and particularly a non-asbestos friction material which produces less low-frequency noises during braking, while keeping its low attack to the mating member and its high fade resistance and friction coefficient.

Asbestos pads are now being rapidly replaced by non-asbestos ones. One problem with such non-asbestos pads is that they tend to produce low-frequency noises during braking.

One way to reduce such noises is to rub off any deposits on the surface of the disk rotor, which are the main cause of such noises, by adding an abrasive having a Moh's hardness of not less than 6 to the friction material. Another way is, as disclosed in Unexamined Japanese Patent Publication 4-60225, to add a flaky inorganic substance having self-shearing lubricating properties such as mica and talc to the friction material. By adding such a substance, the mating member can slide smoothly on the friction member even while the surface pressure is high, at which time low-frequency noises tend to be produced. Thus, it is possible to prevent stick slip, which is the major cause of low-frequency noises.

Another solution, which is proposed in Unexamined Japanese Patent Publication 5-32956, is to add a non-metallic inorganic substance having a Moh's hardness between 3 and 9 and an inorganic hydrate having a Moh's hardness not exceeding 5 in predetermined amounts, while reducing the carbon content.

In the method in which deposits on the surface of the rotor are removed by adding an abrasive to the friction member, the abrasive has to have a sufficiently large particle size. But the larger the particle size of the abrasive, the more severely the friction member tends to attack the rotor. This leads to local increase in the surface pressure during braking. Such locally high surface pressure may cause streaks on the surface of the rotor, which tends to destabilize the braking effect and increase squeaks (high-frequency noise) during braking.

In the method in which a flaky inorganic substance such as mica or talc is added, due to crystal structure of the inorganic substance used, the friction coefficient (hereinafter referred to as $\mu$) tends to be low, so that the resistance to fading drops. It is also known that if an abrasive having a large particle size is added to the friction material in an attempt to increase $\mu$, the resistance to fading drops markedly for unknown reasons.

In the technique proposed in Unexamined Japanese Patent Publication 5-32956, by reducing the carbon content, it is possible to suppress the production of substances that form a film deposit. Also, the hydrate added serves to prevent the film forming substances from adhering to the surface of the rotor. Moreover, the inorganic substance having a Moh's hardness of 3–9 removes any deposits on the rotor surface. But since the hydrate has a low Moh's hardness, $\mu$ tends to be low. Also, the hydrate presumably causes a drop in the wear resistance of the friction material.

Further, if the inorganic substance having a high Moh's hardness is too high in particle size, the rotor tends to be worn unevenly. If too low, deposits cannot be removed effectively.

The applicant of this invention also proposed in Unexamined Japanese Publication 62-15281 to add 8–12% by volume of magnesium oxide powder having a maximum particle diameter not exceeding 250 $\mu$m in order to increase $\mu$. Since the magnesium oxide has a high Moh's hardness, it acts as an abrasive. But if its particle size is too large, the friction member tends to more severely attack the mating member. If too small, it cannot remove deposits effectively.

In short, none of these conventional methods can suppress low-frequency noise without worsening any of the other properties of the friction material.

An object of the present invention is to provide a high-performance, non-asbestos friction material which produces less low-frequency noises while keeping low its tendency to attack the rotor, its high fade resistance and high $\mu$.

SUMMARY OF THE INVENTION

According to the present invention, there is provided a non-asbestos friction material comprising a reinforcing fiber other than asbestos, organic fillers, friction adjusting ingredients, and a thermosetting resin for binding the reinforcing fiber, the organic fillers and the friction adjusting ingredients together, the friction adjusting ingredients containing magnesia in the form of aggregated particles, which are an aggregate of minute particles.

The aggregated particles of magnesia have a diameter between 1 and 5 $\mu$m and are aggregates of minute particles having a diameter not exceeding 0.5 $\mu$m.

Preferably, the content of the aggregated particles of magnesia should be 3–20% by volume of the entire friction material.

The reinforcing fibers are conventional and may be one or more than one kind of fibers selected from the group consisting of organic fibers such as aramide, acrylic, carbon and phenolic fibers, inorganic fibers such as glass, alumina, silicate and rock wool fibers, steel fibers, stainless steel fibers, copper fibers, and copper alloy fibers such as brass fibers.

The organic filler may be one or more than one selected from cashew dust, melamine dust, NBR powder and SBR powder.

The friction adjusting ingredient may be magnesia and one or a combination selected from lubricants such as molybdenum disulfide, antimony trisulfide and graphite, abrasives such as alumina, zirconium oxide, zirconium silicate, silica or rutile, metallic powders such as copper, aluminum, zinc and tin powders, and inorganic substances such as barium sulfate, calcium carbonate and calcium hydrate.

Further, the friction material contains as a binder one or more than one thermosetting resin selected e.g from phenolic, melamine, polyimide and epoxy resins.

Magnesia is available in two forms, i.e. one manufactured by drying and calcining magnesium hydroxide, and one manufactured by electromelting and pulverizing magnesium hydroxide. The magnesia used in the present invention is the former type. It should preferably be the one obtained by calcining at about 1000° C.

A method of preparing aggregated particles of magnesia is described below. This is a mere example and they may be prepared by any other known method.

An aqueous solution of magnesium chloride is prepared by dissolving magnesium chloride into water. The concentration of the aqueous solution is preferably 80% of the saturation point or lower for uniform reaction and to produce a desired size of particles. The reaction temperature is preferably 30°–50° C. The temperature fluctuation during reaction should be limited to ±5° C. for uniform reaction.

Besides the magnesium chloride solution, an aqueous solution of calcium hydroxide is prepared. Considering its solubility, its concentration is preferably 0.05–0.12%. The temperature of the solution may be the same as with the magnesium chloride solution.

The solution of calcium hydroxide is added to the solution of magnesium chloride while stirring them and keeping their temperature at the abovementioned range to obtain magnesium hydroxide. The magnesium hydroxide thus obtained is in the form of non-aggregated minute particles having a diameter of 0.5 $\mu$m or less.

In order to turn these minute particles into aggregated particles, a high-molecular flocculant is added to the mixed solution. The preferable range of the flocculant concentration in the solution is 0.1–0.3%. The solution is then stirred.

As a result, aggregated particles having a diameter of 1–5 $\mu$m are obtained. They are separated from the solution by filtering. The separated particles are calcined e.g. at about 1000° C. in an atmospheric environment. The calcining time is preferably 4 to 6 hours. Aggregated particles of magnesia having a diameter of 1–15 $\mu$m are thus obtained.

Their particle diameter is then adjusted to 1–5 $\mu$m by pulverizing and sifting. Aggregated particles of magnesia having a diameter of 1–5 $\mu$m are thus obtained.

Instead of magnesium chloride, use may be made of any material which contains Mg ions and does not form a less soluble substance by combining with calcium ions, such as magnesium nitrate.

Magnesia is a hard material having a Moh's hardness of 6. In the present invention, magnesia is added in the form of aggregated particles. With this arrangement, it is possible to increase the diameters of the aggregated particles to a suitable level so that deposits on the rotor surface can be removed effectively, while suppressing the production of low-frequency noises.

Aggregated particles, i.e. aggregates of minute particles, are lower in strength than non-aggregated minute particles. Namely, they are easily deformed under a certain degree of pressure due to the peeling of minute particles forming the aggregated particles. Thus, no local increase in the surface pressure occurs, so that friction vibrations that cause squeaks are less likely to happen. Since the surface pressure is evenly distributed, the rotor is less likely to suffer uneven wear, so that braking effects will remain stable.

Since the aggregated particles collapse easily under a certain degree of pressure, the magnesia is in the form of small-diameter minute particles at the interface with the rotor. Thus, the attack on the mating member (rotor) is kept sufficiently low. Since the friction material according to the present invention contains no flaky inorganic substances, its $\mu$ and resistance to fading are sufficiently high. Since the addition of magnesia never leads to intensified attack on the mating member, it is possible to increase the content of magnesia to a considerable degree. This also leads to increased $\mu$.

By adding the magnesia in the form of aggregated particles, which are aggregates of minute particles, to the friction material according to the present invention, it can remove deposits on the rotor as effectively as a conventional abrasive having large particle diameter, while suppressing the attack on the rotor to a minimum. In short, by adding magnesia, the friction coefficient increases to a sufficient level and stabilizes, the resistance to fading increases, the attack on the mating member decreases, and low-frequency noises and squeaks are less likely to be produced.

If the aggregated particles of magnesia are too small in diameter, they can scarcely suppress low-frequency noises. If too large, the brake tends to squeak. If the minute particles are too large in diameter, the attack on the mating member will intensify.

We have confirmed by experiments that by using magnesia in the form of aggregated particles having a particle diameter of 1 to 5 $\mu$m, which is aggregates of minute particles having a particle size of 0.5 $\mu$m or lower, it is possible to sufficiently suppress low-frequency noises while keeping the attack on the mating member and the squeaks to sufficiently low levels. The diameter of the minute particles is correlated to the calcining temperature of magnesium hydroxide. Namely, the higher the calcining temperature, the larger the minute particle diameter and the harder the magnesia obtained. We set the upper limit of the minute particle diameter at 0.5 $\mu$m partly because minute particles having a diameter larger than 0.5 $\mu$m tend to be too hard. But the real reason therefor is related to the manufacture of aggregated particles of magnesia. Namely, minute particles of magnesia are easily aggregated into the form of aggregated particles at temperatures which can give minute particles having diameters not exceeding 0.5 $\mu$m, whereas at temperature higher than the above range, no aggregated particles are formable.

The higher the content of the aggregated particles of magnesia in the friction material, the more effectively it is possible to reduce low-frequency noises and increase $\mu$. But the smaller the content, the lower the attack on the mating member and the higher the resistance to fading. In order to improve all these properties in a balanced manner, we determined that the content of such magnesia should be 3–20% by volume.

Examples of the present invention are now described.

A 10% aqueous solution of magnesium chloride was prepared by dissolving magnesium chloride into water. The 10% concentration is equal to 27% of the saturation point at 40° C. The temperature was controlled to 40±5° C.

Besides the magnesium chloride solution, a 0.1% aqueous solution of calcium hydroxide was prepared. The temperature of the solution was the same as with the magnesium chloride solution.

The 0.1% solution of calcium hydroxide was gradually added to the 10% solution of magnesium chloride while stirring them and keeping their temperature at the abovementioned point to obtain magnesium hydroxide. The end of the reaction was confirmed by measuring the electrical conductivity of the solution. The magnesium hydroxide thus obtained was in the form of non-aggregated minute particles having a diameter of 0.5 $\mu$m or less. Due to their small size, they floated in water.

In order to turn these minute particles into aggregated particles, an acrylic ester high-molecular flocculant represented by the following formula was added to the solution until the concentration of the flocculant in the solution becomed 0.2%. The solution was then stirred.

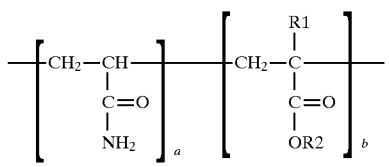

Wherein
R1: alkyl group
R2:

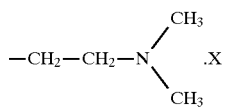

x: acrylic acid
a, b: positive integer

As a result, aggregated particles of magnesium hydroxide having a diameter of 1–5 μm were obtained. They were separated from the solution by filtering. The separated particles were calcined at 1000° C. in an atmospheric environment in a rotary kiln. The degree of calcining was determined according to particle diameter as measured by X-ray diffraction. The particle diameter is preferably 400–600 angstroms. The calcining time was six hours. Aggregated particles of magnesia having a diameter of 1–15 μm were thus obtained.

Their particle diameter was then adjusted to 1–5 μm by pulverizing and sifting. The aggregated particles of magnesia having a diameter of 1–5 μm were thus obtained.

Disk brake pads for use in automobiles as Examples 1–11 and Comparative Examples 1–4 were prepared using materials having the composition shown in Tables 1 and 2. For each pad, we measured the low-frequency noise level, squeak level, friction coefficient ($\mu$), resistance to fading, and attack to the mating member. Particle diameters in the tables are average values. Aggregated particles shown in the tables are all aggregates of minute particles having a diameter of 0.5 μm or less.

Reinforcing fibers used in any of Examples and Comparative Examples were a combination of aromatic polyamide fibers, slug wool fibers and copper fibers.

Also, we used cashew dust and NBR powder as the organic filler, a phenolic resin as the binder, and graphite, molybdenum disulfide, barium sulfate, and calcium hydroxide as the friction adjusting ingredients.

As shown in the tables, the components from the aromatic polyamide to the calcium hydroxide are identical both in the kind and volume percentage in all of the Examples and Comparative Examples, with only the kind and content of the magnesium oxide (magnesia) being different from one another. Example 7 and Comparative Example 3 further contain mica. The difference in the overall volume among the specimens due to the difference in the volume percentages of these components were adjusted by adding different amounts of barium sulfate.

The pad samples were manufactured with a known molding technique. Specifically, the material powders mixed in the ratios shown in Tables 1 and 2 were pre-formed under the pressure of 300 kg/cm² at normal temperature, and then pressurized while degassing at 400 kg/cm² in a mold heated to 160° C. The articles thus formed were heated for five hours at 230° C. for after-curing of the phenolic resin, and then grinded to a predetermined thickness to obtain the pad samples.

Various properties of the brake pads thus obtained were measured in the following manner.

1) Measurement of low-frequency noises and squeaks

Each pad samples was fitted on a vehicle (automatic-transmission passenger car with a 2000 cc engine) and the car was started and stopped under the conditions shown in the noise confirmation matrix in Table 3, while the driver checked if he heard low-frequency noises and/or squeaks when the car was started and stopped. The corresponding figures in Tables 1 and 2 represent the percentages of the number of times the driver heard low-frequency noises and squeaks, respectively.

2) Measurement of friction coefficient and fade min $\mu$

These properties were measured using a brake dynamometer under the test code JASO C406-82 and under the conditions of: caliper: floating type (cylinder area 20.4 cm²), inertia: 5 kg.m.S², tire radius; 0.280 m, effective braking radius: 0.094 m, disk rotor diameter: 0.238 m, disk rotor thickness: 18 mm (ventilated type).

3) Measurement of the attack on the mating member

This test was conducted using a brake dynamometer under the conditions of: rotor temperature before braking: 50° C., initial velocity: 50 km/hr, deceleration: 0.3 g, the number of time the brake is applied: 1000. After the test, the amount of wear of the rotor was measured. Other test conditions were the same as those in the test 2).

The results of this test are shown in Tables 1 and 2.

As will be apparent from the results for Examples 1–6 in Table 1, the higher the content of the aggregated particles of magnesia, the less low-frequency noises are likely to be produced. From the result of Example 7, it is apparent that the addition of mica further strengthens the noise-suppressing effect.

The value $\mu$ also tends to increase with the content of magnesia. In contrast, the fade min $\mu$ tends to drop as the content of magnesia increases. The attack on the rotor is supposed to increase as the content of magnesia increases. But in the present invention, by using the aggregated particles of magnesia, the attack on the rotor intensified little even when the content of magnesia is increased. For example, there is a big difference in the attack level on the mating member between Examples 1 and 3 on the one hand and Comparative Examples 1 and 2 on the other, in spite of the fact that the content and the particle diameter of the magnesia added are the same.

Comparative Examples 1–3 shown in Table 2 contain magnesia obtained by electromelting and not in the form of aggregated particles. That is, the magnesia consists of discrete minute particles. At particle diameter of about 2 μm, they cannot suppress low-frequency noises at all. On the other hand, Examples according to the present invention can reduce low-frequency noises markedly even if its minute particle diameters are small. The smaller the minute particle diameters, the smaller the aggregated particle diameters, so that the less the brake is likely to squeak and the lower the attack on the rotor. Although magnesia formed by electromelting can increase the $\mu$ value more effectively, it is apparent that magnesia in the form of aggregated particles can more effectively increase the resistance to fading, suppress squeaks and lower the attack on the rotor. As for the resistance to fading, the difference is particularly big between the materials containing mica (Example 7 and Comparative Example 3). Thus, it is more advantageous to use magnesia in the form of aggregated particles than magnesia obtained by electromelting if mica is added to reduce low-frequency noises.

Examples 8–11 were prepared to see what influence the diameter of the aggregated particles of magnesia has on various properties of the friction material. No significant difference in performance is seen while the aggregated particle diameters of magnesia are within the range of 1–5 μm. But Example 10, whose aggregated particle diameter is 0.7 μm, produced a rather high level of low-frequency low in the attack on the mating member, high in the resistance to fading, and less likely to cause uneven wear of the rotor, squeaks and low-frequency noises.

[TABLE 1]

| Component/No | Examples |||||||||||
|---|---|---|---|---|---|---|---|---|---|---|---|
| | 1 | 2 | 3 | 4 | 5 | 6 | 7 | 8 | 9 | 10 | 11 |
| Material (vol %) |||||||||||||
| Aromatic polyamide fiber | 15 | 15 | 15 | 15 | 15 | 15 | 15 | 15 | 15 | 15 | 15 |
| Rock wool | 5 | 5 | 5 | 5 | 5 | 5 | 5 | 5 | 5 | 5 | 5 |
| Copper fiber | 5 | 5 | 5 | 5 | 5 | 5 | 5 | 5 | 5 | 5 | 5 |
| Cashew dust | 15 | 15 | 15 | 15 | 15 | 15 | 15 | 15 | 15 | 15 | 15 |
| NBR powder | 5 | 5 | 5 | 5 | 5 | 5 | 5 | 5 | 5 | 5 | 5 |
| Phenol resin | 20 | 20 | 20 | 20 | 20 | 20 | 20 | 20 | 20 | 20 | 20 |
| Graphite | 5 | 5 | 5 | 5 | 5 | 5 | 5 | 5 | 5 | 5 | 5 |
| Molybdenum sulfate | 2 | 2 | 2 | 2 | 2 | 2 | 2 | 2 | 2 | 2 | 2 |
| Calcium hydroxide | 2 | 2 | 2 | 2 | 2 | 2 | 2 | 2 | 2 | 2 | 2 |
| Barium sulfate | 25 | 23 | 21 | 16 | 6 | 1 | 6 | 16 | 16 | 16 | 16 |
| Mica | | | | | | | 10 | | | | |
| Magnesium oxide Aggregated particle |||||||||||||
| 2 μm | 1 | 3 | 5 | 10 | 20 | 25 | 10 | | | | |
| 1 μm | | | | | | | | 10 | | | |
| 5 μm | | | | | | | | | 10 | | |
| 0.7 μm | | | | | | | | | | 10 | |
| 7 μm | | | | | | | | | | | 10 |
| Electromelt 2 μm |||||||||||||
| Property |||||||||||||
| Low-frequency noise (%) | 6.2 | 2.2 | 2.1 | 1.5 | 1.3 | 1.1 | 0.3 | 1.3 | 1.4 | 5.9 | 1.8 |
| Squeak (%) | 0 | 0 | 0 | 0 | 0 | 3.3 | 0 | 0 | 0 | 0 | 4.3 |
| Friction coefficient (μ) Deceleration 0.6 g |||||||||||||
| 20 km/h | 0.35 | 0.37 | 0.38 | 0.40 | 0.42 | 0.45 | 0.40 | 0.40 | 0.41 | 0.39 | 0.40 |
| 50 | 0.33 | 0.35 | 0.36 | 0.37 | 0.39 | 0.41 | 0.37 | 0.38 | 0.39 | 0.37 | 0.38 |
| 100 | 0.36 | 0.38 | 0.38 | 0.40 | 0.40 | 0.43 | 0.38 | 0.39 | 0.40 | 0.39 | 0.41 |
| 130 | 0.31 | 0.32 | 0.32 | 0.35 | 0.35 | 0.37 | 0.33 | 0.34 | 0.36 | 0.34 | 0.36 |
| Fade min μ | 0.25 | 0.25 | 0.25 | 0.24 | 0.22 | 0.19 | 0.22 | 0.24 | 0.25 | 0.23 | 0.22 |
| Rotor attack μm | 1 | 2 | 2 | 3 | 4 | 6 | 3 | 3 | 3 | 2 | 4 | noises. Example 11, having a aggregated particle diameter of 7 μm, squeaked a little louder.

Similar phenomena were also observed where the content of aggregated particles of magnesia is less than 3% by volume (Example 1) or more than 20% by volume (Example 6).

The preferable ranges of the diameter and content of the aggregated particles of magnesia were determined taking these results into consideration.

The combinations of components mentioned in Examples are mere examples. The abovementioned various benefits of the present invention may be obtained with other combinations of the components listed in Table 3 and/or with the aggregated particles of magnesia added in a different amount.

As described above, the friction member according to the present invention contains magnesia, a substance capable of effectively removing deposits on the rotor surface and increasing μ, in the form of aggregated particles, or aggregates of minute particles. Thus, it is possible to reduce low-frequency noises without worsening other properties. Thus, according to the present invention, there is provided a high-performance non-asbesos friction material which is

[TABLE 2]

| Component/No | Examples ||||
|---|---|---|---|---|
| | 1 | 2 | 3 | 4 |
| Material (vol %) |||||
| Aromatic polyamide fiber | 15 | 15 | 15 | 15 |
| Rock wool | 5 | 5 | 5 | 5 |
| Copper fiber | 5 | 5 | 5 | 5 |
| Cashew dust | 15 | 15 | 15 | 15 |
| NBR powder | 5 | 5 | 5 | 5 |
| Phenol resin | 20 | 20 | 20 | 20 |
| Graphite | 5 | 5 | 5 | 5 |
| Molybdenum sulfate | 2 | 2 | 2 | 2 |
| Calcium hydroxide | 2 | 2 | 2 | 2 |
| Barium sulfate | 25 | 21 | 11 | 26 |
| Mica | | | 10 | |
| Magnesium oxide Aggregated particle |||||
| 2 μm | | | | |
| 1 μm | | | | |
| 5 μm | | | | |
| 0.7 μm | | | | |

[TABLE 2]-continued

| Component/No | Examples | | | |
|---|---|---|---|---|
| | 1 | 2 | 3 | 4 |
| 7 μm Magnesium oxide Aggregated particle | | | | |
| Electromelt 2 μm | 1 | 5 | 5 | |
| | Property | | | |
| Low-frequency noise (%) | 9.5 | 13.5 | 5.6 | 15.9 |
| Squeak (%) | 5.8 | 7.9 | 8.5 | 2.5 |
| Friction coefficient (μ) Deceleration 0.6 g | | | | |
| 20 km/h | 0.39 | 0.42 | 0.40 | 0.34 |
| 50 | 0.37 | 0.39 | 0.38 | 0.33 |
| 100 | 0.39 | 0.38 | 0.37 | 0.34 |
| 130 | 0.34 | 0.32 | 0.30 | 0.29 |
| Fade min μ | 0.21 | 0.19 | 0.13 | 0.25 |
| Rotor attack μm | 7 | 9 | 10 | 1 |

[TABLE 3]

| | Pad temp before braking (°C.) | Initial speed (km/hr) | Deceleration (g) | Braking number of times (time) | Braking Interval (m) |
|---|---|---|---|---|---|
| 1 Noise check matrix | 100, 150 200, 250 | 50 | 0.1, 0.3 0.5, 0.7 | 1 each | |
| 2 Rubbing | 100 | 65 | 0.35 | 200 | |
| 3 Noise check matrix | 100, 150 200, 250 | 50 | 0.1, 0.3 0.5, 0.7 | 1 each | |
| 4 Fade | 65 (first time) | 100 | 0.45 | 15 | 650 |
| 5 Noise check matrix | 100, 150 200, 250 | 50 | 0.1, 0.3 0.5, 0.7 | 1 each | |

What is claimed is:

1. A non-asbestos friction material comprising a reinforcing fiber other than asbestos, organic fillers, friction adjusting ingredients, and a thermosetting resin for binding together the reinforcing fiber, the organic fillers and the friction adjusting ingredients, said friction adjusting ingredients containing magnesia in the form of aggregated particles having a diameter between 1 and 5 μm, which are aggregates of minute particles having a diameter not exceeding 0.5 μm, said friction ingredients being used in amounts sufficient to reduce low-frequency noises while reducing the attack on mating members, when said non-asbestos friction material is used in automotive disk brake pads and brake linings.

2. A non-asbestos friction material claimed in claim 1 wherein the content of said aggregated particle of magnesia is 3–20% by volume of the entire friction material.

3. A non-asbestos friction material claimed in claim 2 wherein the reinforcing fiber is selected from the group consisting of aramide fibers, acrylic fibers, carbon fibers, phenolic fibers, glass fibers, alumina fibers, silicate fibers, rock wool fibers, steel fibers, stainless steel fibers, copper fibers, and copper alloy fibers.

* * * * *